Figure 1:
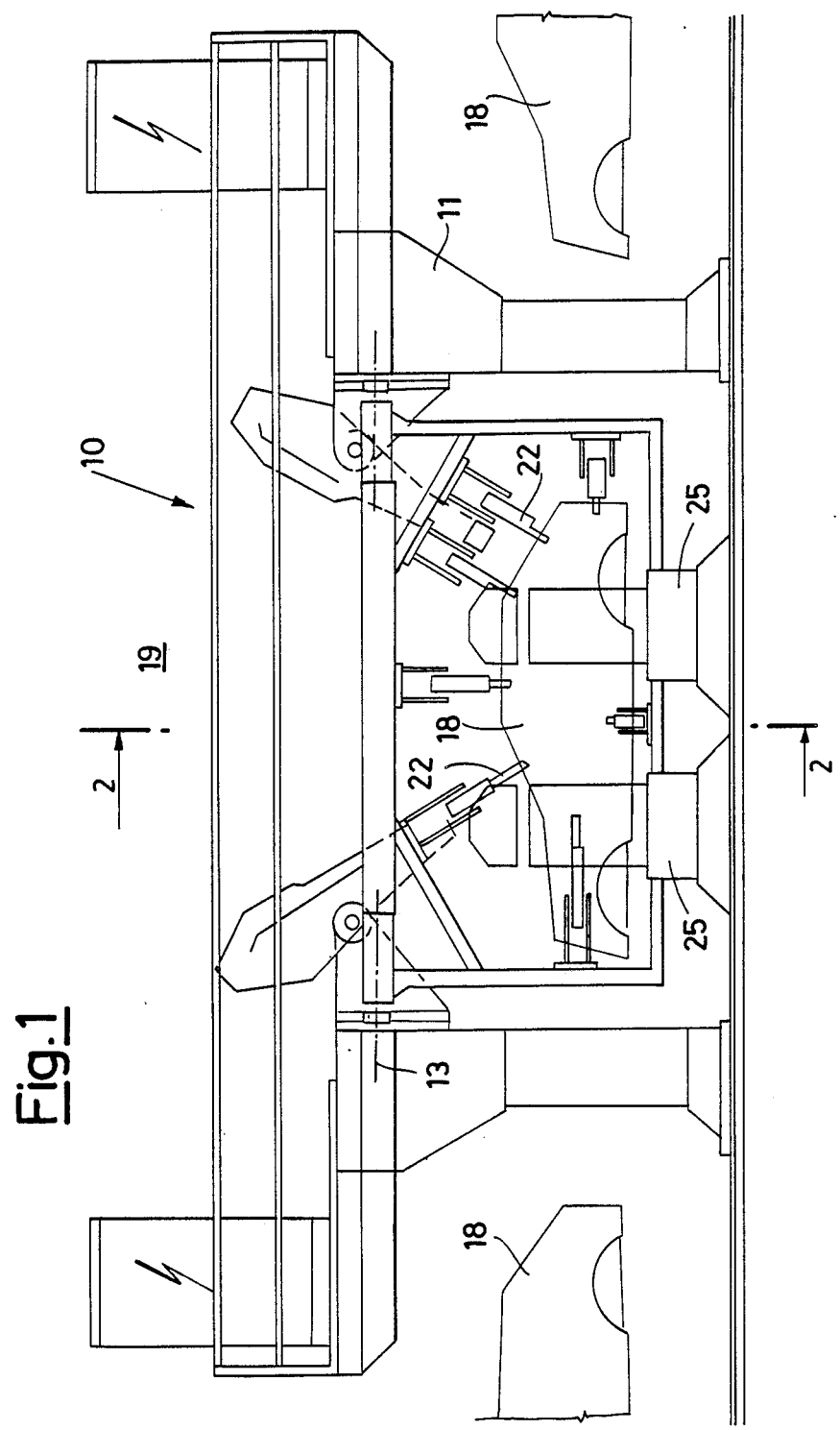

United States Patent [19]

Di Rosa

[11] Patent Number: 4,972,987
[45] Date of Patent: Nov. 27, 1990

[54] PLANT EQUIPPED WITH REVOLVING TOOL ASSEMBLIES FOR WELDING AUTOMOTIVE VEHICLE BODIES IN A SINGLE PROCESSING STATION

[75] Inventor: Gaetano Di Rosa, Pino Torinese, Italy

[73] Assignee: Fata Automation S.p.A., Turin, Italy

[21] Appl. No.: 497,813

[22] Filed: Mar. 22, 1990

Related U.S. Application Data

[63] Continuation of Ser. No. 374,070, Jun. 30, 1989, abandoned.

[30] Foreign Application Priority Data

Jul. 7, 1988 [IT] Italy ................ 21276 A/88

[51] Int. Cl.⁵ ............. B23K 37/02; B23K 11/36; B23Q 7/14
[52] U.S. Cl. ................. 228/4.1; 228/44.3; 228/45; 228/47; 219/79; 29/40; 29/50
[58] Field of Search ......... 228/4.1, 5.1, 44.3, 228/45, 47; 219/79, 80, 86.24, 158; 29/40, 50, 759

[56] References Cited

U.S. PATENT DOCUMENTS

| | | | |
|---|---|---|---|
| 4,483,476 | 11/1984 | Fujikawa et al. | 228/4.1 |
| 4,494,687 | 1/1985 | Rossi | 228/47 |
| 4,659,895 | 4/1987 | Di Rosa | 219/79 |
| 4,667,866 | 5/1987 | Tobita et al. | 228/4.1 |
| 4,736,515 | 4/1988 | Catena | 29/714 |
| 4,905,884 | 3/1990 | Alborante et al. | 228/4.1 |

FOREIGN PATENT DOCUMENTS

1461432  1/1977  United Kingdom ............... 228/4.1

*Primary Examiner*—Sam Heinrich
*Attorney, Agent, or Firm*—Finnegan, Henderson, Farabow, Garrett, and Dunner

[57] ABSTRACT

A plant for welding automotive vehicle bodies that are conveyed in succession in an assembly line to a single processing station having equipment for positioning, holding and welding different types of automotive bodies, a pair of opposed stationary frames pivotally supporting elongate members, which in turn rotatably support tool supporting units, each of which carries a plurality of tool assemblies. The elongate members pivot normal to the assembly line path to place the tool supporting units in and out of operating position; and the tool assemblies are revolvable about the rotatable tool supporting units to select one of the tool assemblies for a particular vehicle body type.

9 Claims, 4 Drawing Sheets

PLANT EQUIPPED WITH REVOLVING TOOL ASSEMBLIES FOR WELDING AUTOMOTIVE VEHICLE BODIES IN A SINGLE PROCESSING STATION

This application is a continuation of application Ser. No. 374,070 filed June 30, 1989, now abandoned.

DESCRIPTION

The present invention relates to an improved plant for performing a welding operation commmonly called "tacking", of automotive bodies in a single processing station, comprising a pair of opposed stationary units on which the tools required for the work are mounted in a revolving manner.

As is well known to those skilled in the sector of automatic plants for the assembly and welding of shaped metal sheets and similar details in monolithic structures, such as, for example automotive vehicle bodies, truck cabs and the like; elements called "configurators" which consist of a frame supporting centering means and holding clamps, and optionally welding clamps, arranged in such a manner as to hold and weld a particular configuration of sheet metal have already been proposed. Given their peculiar function the configurators must be actuated especially for a specific product, since the holding and welding clamps must be designed and arranged appropriately.

To make the processing stations of the production line flexible the configurators do not form a single block with the processing station, but can be disengaged therefrom and substituted to adapt a given processing station to different products, e.g. when processing different models of automotive vehicle bodies.

Such a plant is described for example in German Pat. No. 2810822.

In seeking to make the plant still more flexible there have been provided, as described for example in Italian Pat. No. 20226 A/84 filed 26 Mar. 1984, Pat. No. 23102 A/82 filed 2 Sept. 1982, and Pat. No. 23055 A/83 filed 29 Sept. 1983, all in the name of Gaetano Di Rosa and Italian patent application No. 67563 A/77 in the name of Weldesign di Nepote André & C. s.a.s., processing stations comprising a handling system for said configurators designed to automatically replace the configurators by withdrawing them from a stock of configurators and positioning them automatically in their working position in the processing station. This makes possible the alternation, on the production line, of different models each of which is associated, a particular pair of configurators. The processing requires in general, a configurator for each side of the line.

Although the system proposed for storage of the configurators, the number of said configurators and the method of moving them to the position provided in the processing station are different in each of the above mentioned patents, said systems suffer in general from a serious and fundamental shortcoming due to their structural complexity, and the space they occupy particularly storage space.

In such known systems handling of the configurators also requires a rather long time.

In addition, the configurator conveyance and alternation system is rather complex since it has to be sized for accurate handling of the large, heavy loads represented by the configurators; and this adds considerably to the cost of building and maintaining it.

The general object of the present invention is to obviate the above mentioned shortcomings by providing an automatic plant for the assembly of shaped metal sheets, and others, which, while being able to handle different models of workpieces, would have a very simple, compact structure; and would permit rapid change of the tools in the processing station.

Another object of the inventions is to accomplish a plant of the above type designed in such a way as to permit the use of a portal welding robot on the top of the body.

In accordance with the present invention the above mentioned objects are achieved by a plant for welding automotive vehicle bodies in a single processing station, to which said bodies are fed in succession. There is arranged in said station processing equipment for said bodies, comprising positioning, holding and optionally welding, means characterized in that said equipment is born by a pair of opposed stationary units, each of which includes a plurality of different tool assemblies mounted in a revolving manner so that the tools making up each individual assembly are presented selectively in operating position.

In accordance with another feature of the invention each unit, including the tool assemblies, is movable between a nonoperating position outside the path of travel of the body in the processing station, and an operating position, wherein the tool groups are designed to perform the processing of said body.

Figure 2:
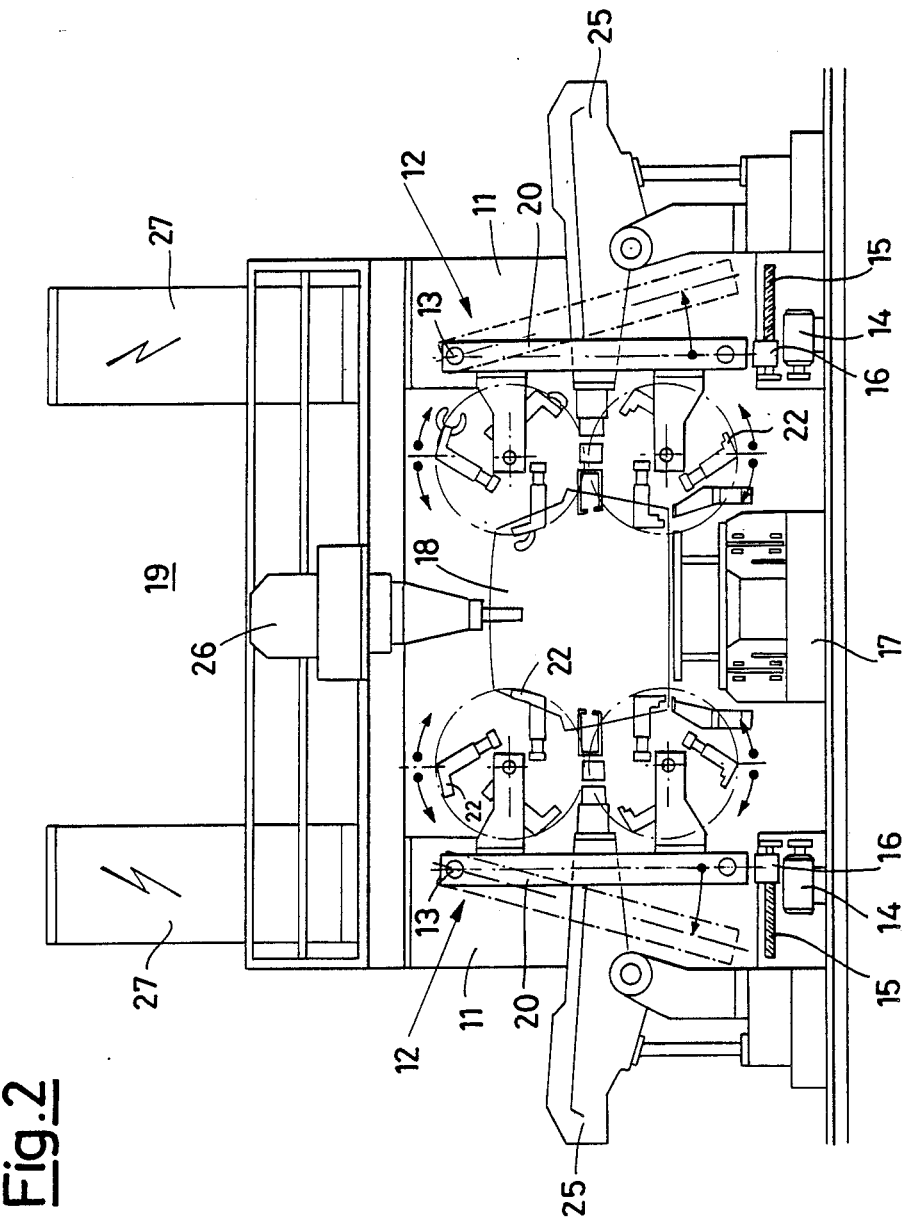
Figure 3:
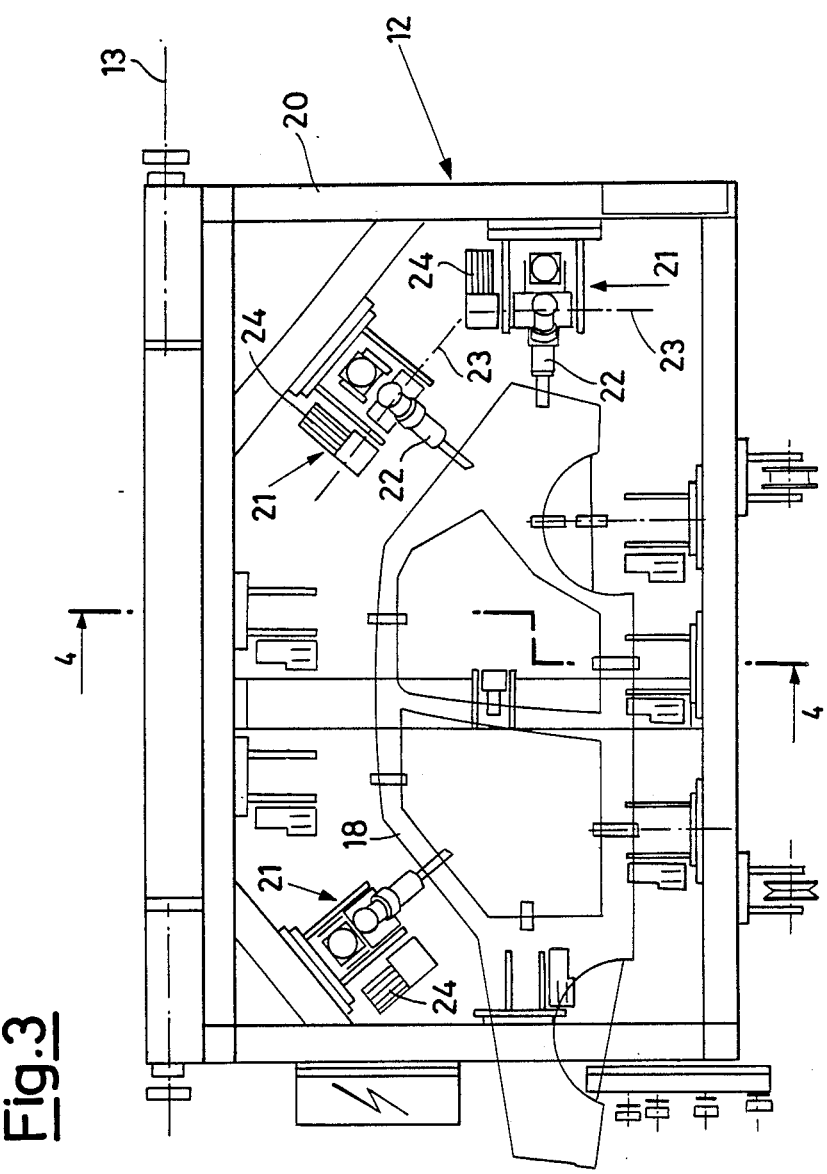
Figure 4:
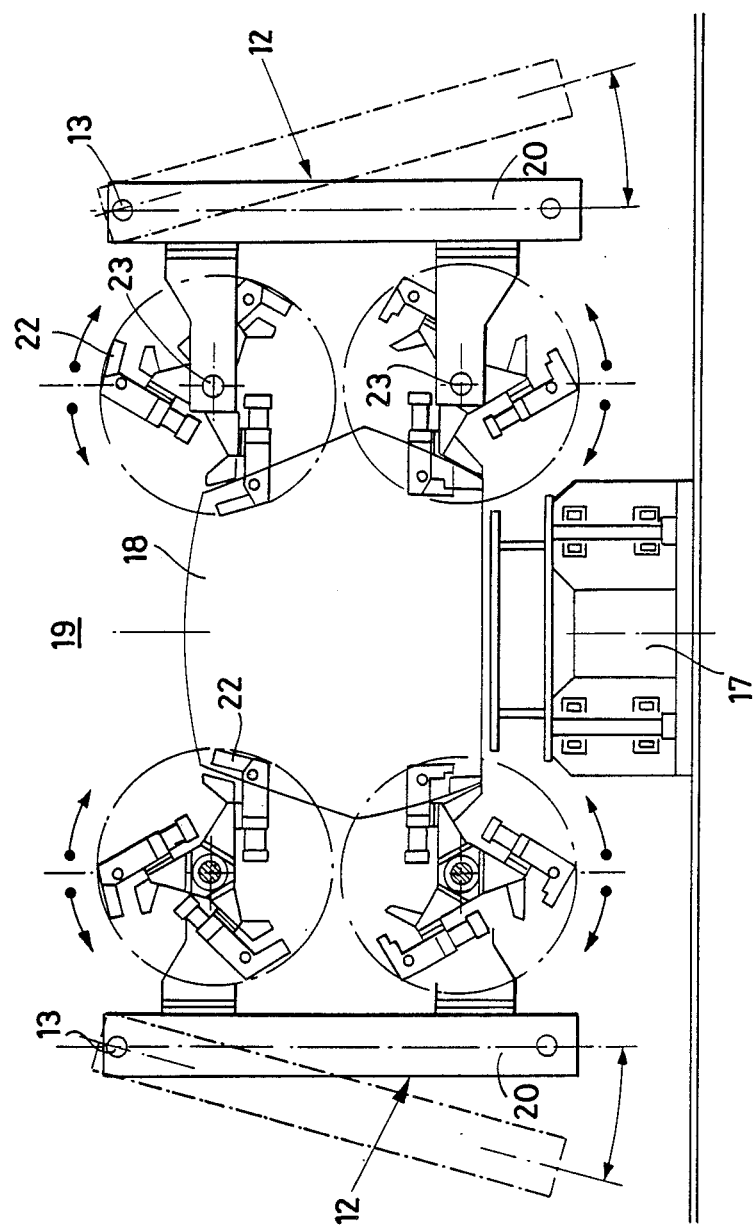

The structural and functional features of the invention and its advantages, as compared with the known art, are made more clearly understandable in the following description, and with reference to the annexed schematic drawings, which show an example of practical application of a plant in accordance with the invention. In the drawings FIG. 1 is an elevational view illustrating an assembly plant incorporating the present invention, FIG. 2 shows a schematic cross section along plane II—II of FIG. 1, FIG. 3 shows an elevational view illustrating an individual unit having a plurality of tool groups according to the present invention, and FIG. 4 is a cross section along plane IV—IV of FIG. 3.

With reference to the drawings, the plant which is the object of the invention, is indicated as a whole by reference number 10 and is made up structurally of a frame 11 bearing a pair of opposed stationary units 12. Said units 12 are mounted in a swinging manner around an upper shaft 13 around which they can be rotated at will driven by a motor 14 through a kinematic chain, e.g. with a screw 15 and a nut screw 16.

As may be seen clearly in the drawings the opposed units 12 are appropriately spaced so that there can pass between them a line indicated generally by reference number 17 for the programmed feeding of bodies 18 of automotive vehicles to a processing station 19. The line 17 will not be described and illustrated in greater detail as it may be of any type well known to those skilled in the art.

Each unit comprises a frame structure 20 (FIG. 3) bearing a plurality of tool assemblies 21 designed for performance of operations on a body 18. Said tools consist of elements shown schematically and indicated by reference number 22 which can perform for example positioning, holding and welding of the body. Even said elements 22, being of a known type, are not described and illustrated in greater detail.

In accordance with the invention each assembly 21 is mounted in a stepped manner and made to revolve by an actuator 24 in the directions indicated by the arrows 5 in FIG. 4 around a shaft 23. More precisely as shown in FIGS. 2 and 4 the units 12 can be swung around the shaft 13 in the directions indicated by the arrows between two positions shown in broken and solid lines respectively. The position shown in broken lines is not operative and does not interfere with the path of travel of the bodies 18 in the station 19 while the position shown in solid lines is operative to bring the unit 12 opposite the body 18 to process it. The various positions of the unit 12 and the individual assemblies 21 are determined accurately by stop and positioning means of known type.

Reference number 25 indicates a floor-mounted welding robot while reference number 26 indicates a portal robot supported above the body by the same frame 11 and traversable on slides in a known manner.

Reference number 27 indicates generally the cabinets containing the feeding, command and control equipment of the plant.

Operation of the plant which is the object of the invention is clear from the above description and with reference to the drawings and is briefly as follows.

By means of the controls 14, 15 and 16 the opposed units 12 are swung into operating position so as to bring the associated tools 22 of each revolving tool assembly 21 into position facing the body to be processed. Said operating position is rigidly determined by intervention of suitable holding means.

At this point processing of the body can begin.

Upon each change of the body model arriving at the station 19 the assemblies 21 of tools 22 are selectively commanded to rotate so as to bring into operating position the equipment designed for processing the new body model.

The advantages of the plant in accordance with the invention may be briefly summarized as follows: (a) minimal time for adaptation of the plant to the various body models, (b) extreme simplicity of construction of the plant in comparison with the known ones and hence lower manufacturing costs, (c) reduced maintenance thanks to the small number of actuators used and total freedom from large moving masses, (d) increased accuracy because the units bearing the equipment are stationary, and (e) the components are practically wear-free because the plant is stationary.

I claim:

1. A plant for welding automotive vehicle bodies of different configurations at a single station, comprising:
    an assembly line for conveying each of a plurality of automotive bodies in succession in a first direction along a path having a width and height dimension;
    a frame structure mounted on opposite sides of the assembly line and spaced from the path in both the width and height dimension, the frame structure including a cross member assembly disposed above the path fixedly connecting to one another the opposite sides of the frame structure;
    a plurality of spaced elongate members pivotally mounted adjacent one end on first axes to the frame structure and projecting downwardly on opposite sides of the path, each said member being pivotal in a plane transverse to the path;
    at least one tool supporting unit rotatably connected to each elongate member intermediate the pivotal axis and an opposite end of the elongate member to rotate on a second axis in a plane transverse to the path;
    a plurality of tool assemblies, for performing work on automotive bodies of different types mounted angularly about each of the tool supporting units to revolve about the corresponding second axis to position a selected toll assembly in a working position facing the path, each said tool unit being movable in an arc about the corresponding first axis in a plane transverse to the direction of the assembly line path to position the selected tool assembly in an operating position.

2. The plant of claim 1 wherein the frame structure includes angle members extending diagonally relative the path of the assembly line, and further comprises at least one second elongate member pivotally mounted adjacent one end to the angle members to pivot on a third axis in a plane transverse to the direction of the assembly line path and transverse to the pivotal plane of the plurality of elongate members.

3. The plant of claim 1, further comprising driving means adjacent the opposite end of each elongated member for pivoting the corresponding elongate member to either an operating or nonoperating position independently of others of the plurality of elongate members.

4. The plant of claim 2, further comprising driving means adjacent the opposite end of each elongated member for pivoting the corresponding elongate member to either an operating or nonoperating position independently of others of the plurality of elongate members.

5. The plant of claim 1, further comprising driving means mounted on each tool supporting unit for rotating the corresponding tool assemblies to a selected position independently of the other tool supporting units.

6. The plant of claim 2, further comprising driving means mounted on each tool supporting unit for rotating the corresponding tool assemblies to a selected position independently of the other tool supporting units.

7. The plant of claim 2 wherein each of the first and third axes are disposed at a location higher than the height dimension of the assembly line path, and each of the second axes are disposed beyond the width dimension of the assembly line path.

8. The plant of claim 1 wherein the plurality of elongate members are pivotable in a plane substantially normal to the direction of the assembly line path and substantially parallel to the plane of rotation of the tool supporting units.

9. The plant of claim 2 wherein the plurality of elongate members are pivotal in a plane substantially normal to the direction of the assembly line path and substantially parallel to the plane of rotation of the tool supporting units, and the at least one second elongate member is pivotable in a plane substantially diagonal to the pivotal plane of the plurality of elongate members.

* * * * *

UNITED STATES PATENT AND TRADEMARK OFFICE
CERTIFICATE OF CORRECTION

PATENT NO. : 4,972,987

DATED : November 27, 1990

INVENTOR(S) : Di Rosa

It is certified that error appears in the above-identified patent and that said Letters Patent is hereby corrected as shown below:

Claim 1, column 4, line 13 change "toll" to --tool--.

Signed and Sealed this

Fifteenth Day of September, 1992

*Attest:*

DOUGLAS B. COMER

*Attesting Officer*      *Acting Commissioner of Patents and Trademarks*